(12) United States Patent
Papenfuhs

(10) Patent No.: US 6,835,784 B2
(45) Date of Patent: Dec. 28, 2004

(54) HIGH-MOLECULAR, CROSS-LINKED POLYVINYL BUTYRALS, METHOD FOR THE PRODUCTION THEREOF AND THEIR USE

(75) Inventor: Bernd Papenfuhs, Obertshausen (DE)

(73) Assignee: Kuraray Specialties Europe GmbH, Frankfurt (DE)

( * ) Notice: Subject to any disclaimer, the term of this patent is extended or adjusted under 35 U.S.C. 154(b) by 39 days.

(21) Appl. No.: 10/257,574

(22) PCT Filed: Apr. 12, 2001

(86) PCT No.: PCT/EP01/04259

§ 371 (c)(1),
(2), (4) Date: Oct. 15, 2002

(87) PCT Pub. No.: WO01/79305

PCT Pub. Date: Oct. 25, 2001

(65) Prior Publication Data
US 2003/0166788 A1 Sep. 4, 2003

(30) Foreign Application Priority Data
Apr. 13, 2000 (DE) .......................... 100 18 517

(51) Int. Cl.$^7$ ................................ C08F 8/14
(52) U.S. Cl. ................ 525/330.6; 525/328.7; 525/386
(58) Field of Search .............. 525/328.7, 330.6, 525/386

(56) References Cited

U.S. PATENT DOCUMENTS

| 4,077,324 A | * | 3/1978 | Pacansky et al. ......... 101/450.1 |
| 5,176,947 A | * | 1/1993 | Afzali-Ardakani et al. ............ 428/195.1 |
| 5,656,365 A | * | 8/1997 | Dages ..................... 428/221 |

FOREIGN PATENT DOCUMENTS

| DE | 1596966 | 3/1971 |
| EP | 0102502 A1 | 3/1984 |
| EP | 0 211 818 | 2/1987 |
| EP | 0339731 A1 | 11/1989 |
| WO | 01/793305 A2 | 10/2001 |

OTHER PUBLICATIONS

Chem. Abs. 67: 118176 (Dec. 25, 1967).
Chem. Abs. 105: 98209j (Sep. 22, 1986).
Chem. Abs. 119: 114931 (Oct. 4, 1993).

* cited by examiner

*Primary Examiner*—Bernard Lipman
(74) *Attorney, Agent, or Firm*—Banner & Witcoff, LTD

(57) ABSTRACT

The present invention relates to high-molecular-weight, crosslinked polyvinyl butyrals obtainable by crosslinking a polyvinyl butyral with at least one di- and/or polycarboxylic acid or derivatives of these as crosslinking reagent, to a process for their production, and to their use.

10 Claims, 2 Drawing Sheets

HIGH-MOLECULAR, CROSS-LINKED POLYVINYL BUTYRALS, METHOD FOR THE PRODUCTION THEREOF AND THEIR USE

This is a U.S. National Phase Application Under 35 USC 371 and applicant herewith claims the benefit of priority of PCT/EP01/04259 filed Apr. 12, 2001, which was published Under PCT Article 21(2) in German, and German Application No. 100 18 517.7 filed Apr. 13, 2000.

The present invention relates to novel high-molecular-weight crosslinked polyvinyl butyrals, a process for their production, and their use.

It is known that polyvinyl butyrals can be extruded together with plasticizers to give films used in particular in laminated safety glass.

To increase the molecular weight of polyvinyl butyrals of this type, EP-A-0 211 818 proposes crosslinking polyvinyl butyrals via stable intermolecular diacetal links. The crosslinking takes place via aldehydes having at least two aldehyde groups. The crosslinker here is added prior to or during the acetalization of the polyvinyl alcohols with butyraldehyde.

However, due to the high reactivity of the aldehydes, crosslinking of polyvinyl butyrals with dialdehydes gives polyvinyl butyrals which are highly crosslinked and of very high molecular weight, and which are therefore not always soluble. In addition, low selectivity means that the crosslinking reaction is difficult to control, and it is therefore very difficult to produce products of reproducible quality.

The object of the present invention was therefore to provide polyvinyl butyrals whose mechanical strength is higher than non-crosslinked products and which, in addition, can be prepared reproducibly.

Surprisingly, it has been found that high-molecular-weight polyvinyl butyrals can be prepared reproducibly by crosslinking with di- and/or polycarboxylic acids or with esters of these.

The present invention therefore provides high-molecular-weight, crosslinked polyvinyl butyral obtainable by crosslinking a polyvinyl butyral with at least one di- and/or polycarboxylic acid or with derivatives, preferably esters, of these as crosslinking reagent.

Preferred crosslinking agents are oxalic acid, malonic acid, succinic acid, glutaric acid, adipic acid, maleic acid, fumaric acid, itaconic acid, phthalic acid, terephthalic acid, and also esters of these.

Particularly preferred crosslinking reagents are aliphatic diesters of the formula (I)

$$\text{ROOC—(CH}_2)_n\text{—COOR} \qquad (I)$$

where the radicals R are identical or different and, independently of one another, are $C_1$–$C_4$-alkyl, and n is from 0 to 4, preferably 0.

Use is made particularly of diethyl and/or dimethyl oxalate.

The crosslinked polyvinyl butyrals therefore have the following structural units:

$$\text{P—OOC—(CH}_2)_n\text{—COO—P}$$

where n is from 0 to 4, and P is each of the polyvinyl butyral chains.

The polyvinyl butyrals of the invention have chemical strength markedly higher than that of conventional products.

The starting materials used may be any of the polyvinyl butyrals known to the skilled worker, and there is therefore no restriction of any kind on the molecular weight of the starting polyvinyl butyrals. However, preference is given to polyvinyl butyrals with a molar mass of at least 50 000 g/mol. The polyvinyl alcohol contents of the polyvinyl butyrals used as starting materials are preferably from 10 to 25% by weight, and particularly preferably from 16 to 23% by weight. The polyvinyl acetate contents of the polyvinyl butyrals used as starting materials are preferably from 0 to 20% by weight.

In one preferred embodiment, the high-molecular-weight, crosslinked polyvinyl butyrals prepared according to the invention comprise plasticizer or plasticizer mixtures. The plasticizers used here may be any of the plasticizers known to the skilled worker, in particular esters of polybasic acids, of polyhydric alcohols, or of oligoether glycols. Examples of preferred plasticizers are diesters of aliphatic diols, or of aliphatic polyether diols, or of polyether polyols, with aliphatic carboxylic acids, preferably diesters of polyalkylene oxides, in particular diesters of di-, tri- or tetraethylene glycol with aliphatic $C_6$–$C_{10}$ carboxylic acids, or else diesters of aliphatic or aromatic $C_2$–$C_{18}$ dicarboxylic acids with aliphatic $C_4$–$C_{12}$ alcohols, preferably dihexyl adipate, or else mixtures of the esters mentioned. The amounts of the plasticizer used are the usual amounts known to the skilled worker, and the plasticizer content here is preferably from 25 to 60 parts by weight, based on 100 parts by weight of PVB.

The present invention therefore also provides a process for preparing the polyvinyl butyrals of the invention, which comprises adding the crosslinking reagent, and also, where appropriate, the plasticizer, to the polyvinyl butyral, homogenizing the mixture, where appropriate, and thermally crosslinking the same at temperatures within the range from 80 to 280° C.

In one preferred embodiment, the crosslinking is catalyzed by adding alkaline or acidic additives.

Examples of alkaline or acidic additives which may be used are the hydroxides, alkanoates, carboxylates, sulfates, chlorides, nitrates, or phosphates of alkali metals and/or of alkaline earth metals, and free organic and/or inorganic acids, and amines.

The preparation of the high-molecular-weight, crosslinked polyvinyl butyrals of the invention is described below in greater detail in one preferred embodiment, but without limitation thereto.

The crosslinking reagent may be in dissolved form, for example in the plasticizer, when added to the polyvinyl butyral, and the mixture may then be homogenized.

The concentration of the crosslinking reagent here is preferably in the range from 0.01 to 10% by weight, particularly preferably in the range from 0.1 to 3% by weight, and in particular in the range from 0.1 to 1% by weight, based in each case on polyvinyl butyral.

The thermal crosslinking may be carried out in any of the heatable assemblies known to the skilled worker, e.g. kneaders or autoclaves. However, the crosslinking preferably takes place in an extruder, and indeed preferably at melt temperatures in the range from 80 to 280° C.

The crosslinking reaction is promoted by the polymer alkalinity usually established so as to stabilize the polyvinyl butyral.

The present application also provides a molding composition comprising the high-molecular-weight crosslinked polyvinyl butyral of the invention.

The extrusion process described can also process the polyvinyl butyral of the invention directly to give a film, with the aid of a slot die. Processes for producing polyvinyl butyral films are well known to the skilled worker. Films made from he high-molecular-weight crosslinked polyvinyl butyrals of the invention may also comprise other conventional additives, e.g. oxidation stabilizers, UV stabilizers, dyes, pigments, and also release agents.

The present application therefore also provides a film comprising the high-molecular-weight, crosslinked polyvinyl butyral of the invention.

The films have high tear strength, particularly advantageous for producing laminated safety glass, which is the main application sector for the films.

The present invention therefore also provides the use of the films of the invention for producing laminated safety glass.

The invention is described in detail below using examples, but without being restricted thereby

BRIEF DESCRIPTION OF THE DRAWINGS

Certain preferred embodiments are described below with reference to the accompanying figures in which.

Test Methods

Polyvinyl Alcohol Content of PVB

For this test, the PVB is acetylated with an excess of acetic anhydride in pyridine. After the reaction, the excess acetic anhydride is hydrolyzed with water and the resultant solution is titrated potentiometrically with sodium hydroxide solution. The PVOH content is calculated from the amount of sodium hydroxide solution consumed.

Polyvinyl Acetate Content of PVB

For this test, the PVB is dissolved in a benzyl alcohol/ethanol mixture. The acetyl groups are saponified with an excess of alcoholic potassium hydroxide. The excess potassium hydroxide solution is back-titrated with hydrochloric acid. The polyvinyl acetate content is calculated from the amount of hydrochloric acid consumed.

Mw, Mn

Molecular weights of the polyvinyl butyrals present in the molding compositions are determined by gel permeation chromatography (GPC) in glacial acetic acid using RI detectors. The detectors are calibrated by means of PVB calibration standards whose absolute values are determined by means of static light scattering.

Alkaline Titer of PVB

For this test, the PVB is dissolved in ethanol and titrated with 0.01 molar hydrochloric acid until the color changes from green to violet. The indicator used is a mixture of methylene blue and neutral red. The alkaline titer is calculated from the amount of hydrochloric acid consumed.

Tear Strength

For measuring tear strength, the films are stored under controlled conditions of temperature and humidity for 24 hours at 23° C. and relative humidity of 50%. The tear strength is measured using a tensile and compressive strength test machine (manufacturer: Cadis GbR, model: BRP 201) to DIN 53455.

Melt Index

For measuring melt index, the films are stored under controlled conditions of temperature and humidity for 24 hours at 23° C. and relative humidity of 50%. The measurements on the films are made using a melt index tester (manufacturer: Göttfert, model: MP-D) at 190° C. with a load of 2.16 kg and using a 2 mm die, to ISO 1133.

PVB Film Moisture Level

The moisture level in the PVB film is measured using an infrared photometer (manufacturer: Pier-Electronic GmbH, Wallau), on laminated safety glass. The measurement device is calibrated in advance using appropriate calibration standards.

Pummel

The test specimens for the pummel test are produced as follows: The films are stored under controlled conditions of temperature and humidity for 24 hours at 23° C./30% relative humidity. They are laminated to 2 mm float glass with F/F and Sn/Sn orientation of film to glass surface. The glass is washed with demineralized water prior to coating. The laminated panes of glass are produced by compressing the composites in a prelamination oven using calender rolls at temperatures of from 40 to 100° C. and then compressing the composites in an autoclave at a pressure of 12 bar and at a temperature of 140° C. for 30 minutes.

Figure 1:
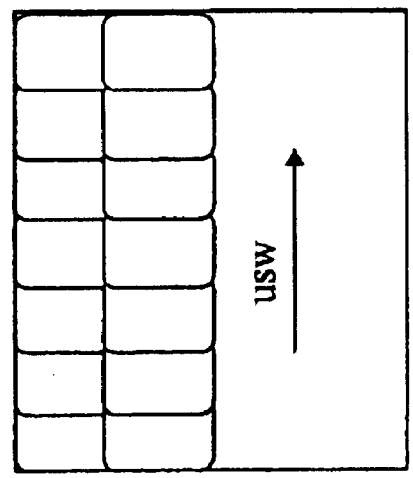
FIG. 1 is a schematic illustration of the orientation of test impacts.
Figure 2:
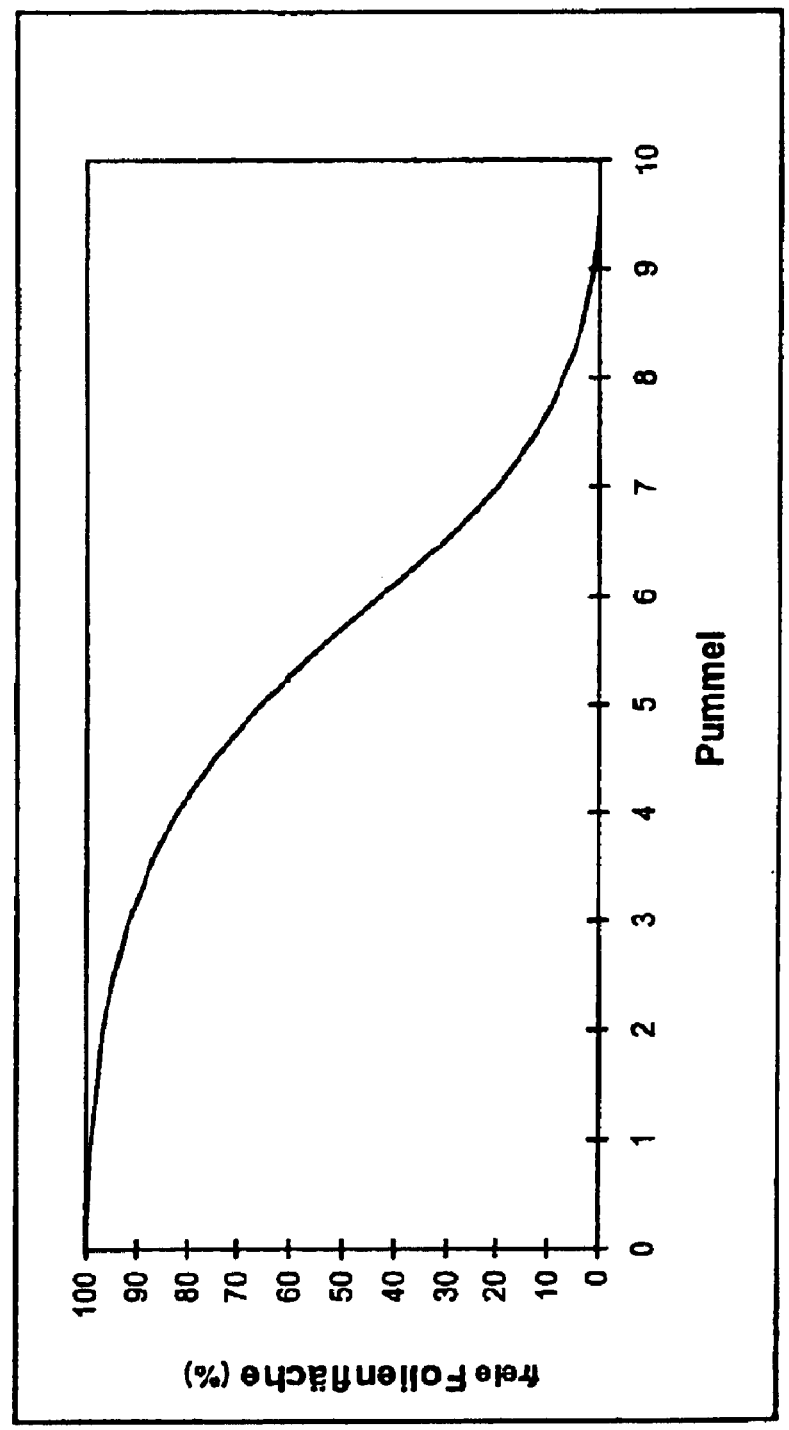
FIG. 2 is a graphical illustration of the results of a standard pummel test.

Test specimens of dimensions 10×30 cm are cut from the resultant laminated safety glass in order to carry out the pummel test. The test specimens are held at −18° C. for 4 hours and then placed on a support tilted at 45° and impacted with an automatic hammer until the glass has been pulverized. The orientation of the impacts is as shown in FIG. 1. The results are evaluated using a standard pummel scale from 0 to 10, as shown in FIG. 2.

EXAMPLES

Comparative Example 1

Mixture 370 g of polyvinyl butyral (polyvinyl alcohol content= 18.9% by weight, polyvinyl acetate content=1.1% by weight, alkaline titer=16 ml of 0.01M HCl/100 g) are mixed with 130 g of triethylene glycol bis(2-heptanoate) (3G7). The mixing takes place in a laboratory mixer (manufacturer: Papenmeier, model TGHKV20/KGU63; Brabender, model 826801). Prior to preparing the mixture, 0.75 g of Tinuvin® P (UV stabilizer, manufacturer: Ciba Specialty Chemicals) is dissolved in the plasticizer. The PVB/plasticizer mixtures are used to extrude flat films of thickness 0.8 mm.

Extrusion

Extrusion takes place in a twin-screw extruder with counter-rotating screws (manufacturer: Haake) equipped with melt pump and slot die, at a melt temperature of 190° C.

Example 1

Mixing and extrusion takes place as in comparative example 1. However, besides the UV stabilizer, 2.22 g of diethyl oxalate crosslinking reagent are also dissolved in the plasticizer.

Comparative Example 2

Mixing and extrusion take place as in example 1. Instead of the PVB used in comparative example 1, use is made of 370 of a polyvinyl butyral with a polyvinyl alcohol content of 20.9% by weight and a polyvinyl acetate content of 1.1% by weight, and with an alkaline titer of 16 ml of 0.01M HCl/100 g.

Example 2

Mixing and extrusion take place as in comparative example 1. Instead of the PVB used in comparative example 1,370 g of the polyvinyl butyral of comparative example 2 are used. Besides the UV stabilizer, 2.22 g of diethyl oxalate crosslinking reagent are also dissolved in the plasticizer, as in example 1.

Comparative Example 3

Mixing and extrusion takes place as in comparative example 1. However, 374.5 g of the polyvinyl butyral from comparative example 1 are used. Instead of the plasticizer (3G7) used in comparative example 1,215.5 g of dihexyl adipate (DHA) are used.

Example 3

Mixing takes place as in comparative example 3 and extrusion as in comparative example 1. However, besides the UV stabilizer 2.22 g of diethyl oxalate crosslinking reagent are also dissolved in the plasticizer, as in example 1.

Comparative Example 4

Mixture 2247 g of polyvinyl butyral (polyvinyl alcohol content=20.6% by weight, polyvinyl acetate content=1.1% by weight, alkaline titer=21 ml of 0.01M HCl/100 g) are mixed with 753 g of dihexyl adipate. Mixing takes place in a laboratory mixer (manufacturer: Papenmeier, model TGHKV20/KGU63; Brabender, model 826801). Prior to preparing the mixture, 4.5 g of Tinuvin® P (UV stabilizer, manufacturer: Ciba Specialty Chemicals) are dissolved in the plasticizer. The PVB/plasticizer mixtures are used to extrude flat films of thickness 0.8 mm.
Extrusion Extrusion takes place in a twin-screw extruder with corotating screws (manufacturer: Leistritz) equipped with melt pump and slot die, at a melt temperature of 200° C.

Example 4a

Mixing and extrusion take place as in comparative example 4. However, besides the UV stabilizer, 6.74 g of diethyl oxalate crosslinking reagent are also dissolved in the plasticizer.

Example 4b

Mixing and extrusion take place as in comparative example 4. However, besides the UV stabilizer, 5.3 g of diethyl oxalate crosslinking reagent are also dissolved in the plasticizer.

Example 4c

Mixing takes place as in example 4b and extrusion as in comparative example 4. An alkaline titer of 77 ml of 0.01M HCl/100 g is also applied to the PVB by means of aqueous potassium hydroxide solution, prior to mixing with the plasticizer.

Example 4d

Mixing takes place as in example 4 and extrusion as in comparative example 4. However, 10.6 g of dimethyl oxalate are used instead of 5.3 g.

Comparative Example 5

Mixture 2220 g of polyvinyl butyral (polyvinyl alcohol content=20.6% by weight, polyvinyl acetate content=1.1% by weight, alkaline titer=21 ml of 0.01M HCl/100 g) with 780 g of triethylene glycol bis(2-heptanoate). Mixing takes place in a laboratory mixer (manufacturer: Papenmeier, model TGHKV20/KGU63; Brabender, model 826801). Prior to preparing the mixture, 4.5 g of Tinuvin® P (UV stabilizer, manufacturer: Ciba Specialty Chemicals) are dissolved in the plasticizer. The PVB/plasticizer mixtures are used to extrude flat films of thickness 0.8 mm.
Extrusion Extrusion takes place in a twin-screw extruder with corotating screws (manufacturer: Leistritz) equipped with melt pump and slot die, at a melt temperature of 200° C.

Example 5

Mixing and extrusion take place as in comparative example 5. However, besides the UV stabilizer, 5.24 g of dimethyl oxalate crosslinking reagent are also dissolved in the plasticizer.

The examples confirm that polyvinyl butyral can be thermally crosslinked using derivatives of dicarboxylic acids. The increase in molecular weight through the effect of the crosslinking reagents is detectable from the rise in the molecular weights Mw and Mn, and also from the fall in the melt index values. The crosslinking reaction is promoted by raising the alkaline titer of the polyvinyl butyral used (cf. comparative example 4 and examples 4b and 4c), and also by rising concentration of the crosslinker (cf. comparative example 4 and examples 4d and 4c). The crosslinking reaction improves the mechanical properties of films produced from the molding compositions, and this is detectable from the rise in tear strengths. The glass adhesion of the films is essentially unaffected by the crosslinking reaction, and this is detectable from the pummel values and is an important precondition for the use of the films in laminated safety glass.

| Example | Comparative example 1 | Example 1 | Comparative example 2 | Example 2 | Comparative example 3 | Example 3 |
|---|---|---|---|---|---|---|
| Polyvinyl alcohol content of starting PVB [%] | 18.9 | 18.9 | 20.9 | 20.9 | 18.9 | 18.9 |
| Polyvinyl acetate content of starting PVB [%] | 1.1 | 1.1 | 1.1 | 1.1 | 1.1 | 1.1 |
| Alkaline titer of starting PVB [ml of 0.01M HCl/100 g] | 16 | 16 | 16 | 16 | 16 | 16 |
| Plasticizer | 3G7 | 3G7 | 3G7 | 3G7 | DHA | DHA |
| Crosslinking reagent | none | diethyl oxalate | none | diethyl oxalate | none | diethyl oxalate |
| Tear strength [N/mm$^2$] | 26.39 | 27.27 | 28.05 | 29.67 | 26.85 | 27.77 |
| MFI 190 [g/10 min] | 2.81 | 2.69 | 4.00 | 1.83 | 3.90 | 3.30 |
| Film moisture level [%] | 0.44 | 0.44 | 0.49 | 0.48 | 0.40 | 0.40 |
| Pummel F | 8 | 7–8 | 8 | 8 | 7 | 6–7 |
| Pummel Sn | 4 | 3–4 | 4 | 3 | 4 | 4 |

| Example | Comparative example 4 | Example 4a | Example 4b | Example 4c | Example 4d | Comparative example 5 | Example 5 |
|---|---|---|---|---|---|---|---|
| Polyvinyl alcohol content of starting PVB [%] | 20.6 | 20.6 | 20.6 | 20.6 | 20.6 | 20.6 | 20.6 |
| Polyvinyl acetate content of starting PVB [%] | 1.1 | 1.1 | 1.1 | 1.1 | 1.1 | 1.1 | 1.1 |
| Alkaline titer of starting PVB [ml of 0.01M HCl/100 g] | 21 | 21 | 21 | 77 | 77 | 21 | 21 |

| Plasticizer | DHA | DHA | DHA | DHA | DHA | 3G7 | 3G7 |
|---|---|---|---|---|---|---|---|
| Crosslinking reagent | none | diethyl oxalate | dimethyl oxalate | dimethyl oxalate | dimethyl oxalate | none | dimethyl oxalate |
| Tear strength [N/mm$^2$] | 30.77 | 32.80 | 32.46 | 32.37 | 32.90 | 28.28 | 28.44 |
| MFI 190 [g/10 min] | 2.39 | 1.75 | 1.73 | 0.78 | 0.46 | 2.28 | 0.54 |
| Mw of PVB after extrusion [g/mol] | 104050 | | 113300 | 142400 | 154100 | | |
| Mn of PVB after extrusion [g/mol] | 54200 | | 60100 | 61150 | 48600 | | |
| Mw/Mn | 1.92 | | 1.89 | 2.33 | 3.11 | | |
| Film moisture level [%] | 0.45 | 0.45 | 0.44 | 0.44 | 0.44 | 0.49 | 0.46 |
| Pummel F | 7–8 | 8 | 8 | 8 | 9 | 6 | 6 |
| Pummel Sn | 5–6 | 5 | 5 | 5 | 4–5 | 4 | 4 |

What is claimed is:

1. A high-molecular-weight, crosslinked polyvinyl butyral obtained by crosslinking a polyvinyl butyral with at least one aliphatic diester of the formula (I):

ROOC—(CH$_2$)$_n$—COOR    (I)

as crosslinking reagent, where the radicals R are identical or different and, independently of one another, are C1–C4-alkyl, and n is from 0 to 4.

2. The polyvinyl butyral as claimed in claim 1, wherein diethyl and/or dimethyl oxylate are used as crosslinking reagents.

3. The polyvinyl butyral as claimed in claim 1, which comprises plasticizer.

4. A process for preparing a polyvinyl butyral as claimed in any one of the preceding claims, which comprises adding the crosslinking reagent, and also, where appropriate, the plasticizer, to the polyvinyl butyral, homogenizing the mixture, where appropriate, and thermally crosslinking the same at temperatures in the range from 80 to 280° C.

5. The process as claimed in claim 4, wherein the crosslinking is catalyzed by adding alkaline or acidic additives.

6. The process as claimed in claim 4, wherein the thermal crosslinking is carried out in an extruder.

7. A method for preparing molding compositions comprising using a polyvinyl butyral as claimed in any one of claims 1 to 3.

8. A method for producing films comprising using a polyvinyl butyral as claimed in any one of claims 1 to 3.

9. A film comprising a polyvinyl butyral as claimed in any one of claims 1 to 3.

10. A method for producing laminated safety glass comprising using a film as claimed in claim 9.

* * * * *